(12) United States Patent
Budni

(10) Patent No.: US 6,785,040 B2
(45) Date of Patent: Aug. 31, 2004

(54) SPECTRAL MODULATION IN AN OPTICAL WAVELENGTH CONVERTER

(75) Inventor: Peter A. Budni, Nashua, NH (US)

(73) Assignee: Bae Systems Information and Electronic Systems Integration Inc., Nashua, NH (US)

( * ) Notice: Subject to any disclaimer, the term of this patent is extended or adjusted under 35 U.S.C. 154(b) by 216 days.

(21) Appl. No.: 10/206,279

(22) Filed: Jul. 27, 2002

(65) Prior Publication Data

US 2003/0035201 A1 Feb. 20, 2003

Related U.S. Application Data

(60) Provisional application No. 60/313,293, filed on Aug. 17, 2001.

(51) Int. Cl.[7] .............................. G02F 2/02; G02F 1/07
(52) U.S. Cl. ........................................ 359/326; 359/258
(58) Field of Search .......................... 359/246, 256–258, 359/326–332

(56) References Cited

U.S. PATENT DOCUMENTS 5,828,484 A * 10/1998 Ho et al. .................... 359/258
6,259,552 B1 * 7/2001 Boffi et al. ................. 359/332

* cited by examiner

*Primary Examiner*—John D. Lee
(74) *Attorney, Agent, or Firm*—Joseph E. Funk

(57) ABSTRACT

Wavelength conversion apparatus is described that utilizes a Kerr cell to modulate the polarization of a pump laser beam having a first wavelength before the beam is input to an optical parametric oscillator/amplifier wavelength converter to generate a laser beam having a second wavelength. By modulating the polarization of the pump laser beam using the Kerr cell, the optical wavelength converter can be controlled to switch on and off or otherwise amplitude modulate the second wavelength laser beam output from the converter, and to correspondingly amplitude modulate the first wavelength and all other laser beams being output from the converter. In addition, with the pump laser beam and the second wavelength laser beam always being output from said wavelength converter there is a substantially constant thermal load on said wavelength converter creating substantially constant thermal lensing in the wavelength converter crystal that may be easily compensated using optical means.

18 Claims, 1 Drawing Sheet

SPECTRAL MODULATION IN AN OPTICAL WAVELENGTH CONVERTER

RELATED APPLICATION

This application is related to U.S. Provisional Patent Application No. 60/313,293, entitled "Spectral Modulation in an Optical Wavelength Converter", filed on Aug. 17, 2001.

FIELD OF THE INVENTION

This invention relates to optical wavelength conversion and to amplitude modulation of optical wavelengths passing through a wavelength converter that is responsive to polarized light at its input.

BACKGROUND OF THE INVENTION

Many applications in which lasers are used require a specific wavelength of light that is not available from standard lasers, or require a first set of multiple wavelengths of light to generate the desired wavelengths. For example, medical lasers may require a laser output to precisely target an area of the body. In such a case, it may be a requirement that the laser be of such a wavelength to insure that no damage to tissue will result. Once the area has been targeted, a different wavelength of laser light may be required to excise the tissue or to provide a therapeutic effect.

A second area where multiple wavelengths are required is in military laser systems. Many of these systems are multi-functional and may require different wavelength laser beams for different functions. An example might be a system with both a tracking and a jamming function. One wavelength may be required to track a target or an enemy system while a second wavelength is required for some type of active countermeasure.

Lasers typically operate at one or more discreet frequencies that depend on the atomic structure of the dopant atoms and, in the case of laser crystals, the structure of the host crystal fields. The stringent material requirements for achieving laser operation greatly limit the frequencies available. Often, the required wavelengths are not available in a simple laser. Under these conditions, designers are forced to use wavelength converters to achieve a broader range of available frequencies in order to accomplish the required tasks.

Laser frequency conversion can be accomplished by using a high intensity pump laser and a wavelength converter. Wavelength converters use non-linear optical materials (eg. crystals) and can be configured as Second Harmonic Generators, and Optical Parametric Amplifiers/Oscillators (OPA/OPO). While there are other types of wavelength converters, we focus our attention on the above mentioned devices. The technique described below, however, is applicable to any such device provided that the device requires intense, polarized laser radiation in order to produce wavelength conversion.

Wavelength converters based on Optical Parametric Oscillators/Amplifiers (OPO/OPA) use non-linear optical materials. When an intense pump laser pulse is incident on an OPO, second order non-linearities take place that allow for the generation of wavelengths other than the wavelength of the pump laser pulse. The non-linear optical materials used are generally crystals having bi-refringent properties. A condition termed phase matching allows for the transfer of energy from the pump laser to the desired conversion wavelengths in an efficient manner. If phase matching is non-optimal, then energy transfer from the pump laser to the generated wavelengths can be controlled.

Laser beam wavelength conversion can be accomplished by using a high intensity pump laser and a wavelength converter. When using an OPO, a pump laser emitting high intensity, linearly polarized light at wavelength $\lambda_1$, impinges on a crystal in the OPO and there is a nonlinear response to the high intensity pump laser radiation that causes additional wavelengths to be generated in the non-linear crystal medium. The non-linear effect in the OPO crystal results in output laser beams at three different wavelengths. The output beams include the fraction of the input pump laser beam at wavelength $\lambda_1$ (pump) not converted by the OPO crystal, the energy converted to the desired output laser beam at wavelength $\lambda_2$ (signal), and a wavelength $\lambda_3$ (idler). For a typical system, approximately 20–60% of the input laser beam is converted to the desired output at wavelengths $\lambda_2$ and $\lambda_3$ When it is desired to turn off the output signal laser beam at wavelength $\lambda_2$, the pump laser is either turned off directly or the pump laser beam can be interrupted using a separate modulator, switch or mechanical chopper. Using this approach, all three wavelengths are available at the output of the wavelength converter when the pump laser is turned on and can be selected. When the pump laser is turned off, none of the wavelengths are available at the output of the OPO. This approach, however, has the effect of creating a variable thermo-optic distortion (thermal lens) in the wavelength converter crystal that both increases the output beam divergence and can create "hot spots" in the laser optical system that can damage optical components. This thermal lens is caused by local heating in the wavelength converter crystal and is caused by absorption of energy from the laser beam as it passes through the crystal. Since in the prior art the laser beam is turned on and off to control when wavelength conversion takes place, a varying thermal load exists and this varying thermal load leads to the formation of a variable thermal lens coincident with the time the laser beam is on or off and cannot be adequately compensated for.

The prior art, as described above, has several limitations that seriously impact laser system design. There is no output laser beam when the wavelength converter is turned off because this is achieved by turning off the input laser beam to the converter. This can be solved, using existing technology, by applying the input laser beam from the pump laser to a beam splitter to provide two optical paths, one path of which passes through the wavelength converter, and the other path of which bypasses the wavelength converter, and only shutting off the path which passes through the wavelength converter when it is desired to have no output laser beam at the desired converted wavelength. The two paths are then recombined at the output of the wavelength converter to provide a single beam with the interrogation capability. This, however, can only be achieved at significant additional cost and complexity and at the expense of added maintenance and reduced reliability.

Thus, there is a need in the prior laser art for an adjustable wavelength converter that is relatively simple.

There is also a need in the prior laser art for minimizing and stabilizing the amount of thermal lensing in crystals of a laser system so that output beam divergence can be stabilized and easily compensated for with other optical elements.

In addition, there is a need in the prior laser art for a relatively simple way to modulate the multiple wavelength laser beams output from a wavelength converter.

SUMMARY OF THE INVENTION

The foregoing needs of the prior art are satisfied by the present invention. A laser system including a Kerr cell and wavelength converter is disclosed that provides wavelength conversion of an input pump laser beam, amplitude modulation of the original and converted wavelength laser beams as they pass through the wavelength converter, and the converted laser beam output from the wavelength converter can be switched on and off to provide a pulsed laser beam.

In addition, the present invention permits stabilization of the thermal lens created in a crystal of the wavelength converter, and thus beam divergence is under a near steady state condition and can be easily compensated for with optical means in a manner well known in the art.

Further, the novel wavelength converter of the present invention provides a relatively simple way to amplitude modulate the multiple wavelength laser beams output from the wavelength converter.

The satisfy the above needs, the present invention uses a Kerr cell at the input of an optical parametric oscillator/amplifier (OPO/OPA) wavelength converter to selectively rotate the polarization of a pump laser beam input to the converter, thus creating a condition whereby the pump laser beam is not always phase-matched in the converter crystal.

The construction of Kerr cells is well known and will not be explained in detail. It will suffice to say that in one form the Kerr cell comprises a number of conductive plates connected by leads to a source of electrical potential. The spaces between the conductive plates is occupied by a dielectric such that electrification of the plates to produce an electric field in the dielectric causes a shift in polarization of a plane polarized wave passing through the Kerr cell, as a result of the well known Kerr effect.

As the Kerr cell is used to rotate the polarization of the pump laser beam between its two extremes it forces the wavelength converter to produce or not produce the desired conversion signal ($\lambda_2$) and idler signal ($\lambda_3$) wavelengths. At the same time, pump laser radiation ($\lambda_1$) is always present in the crystal, where absorption of the incident radiation creates thermal lensing. However, because the crystal sees a near constant thermal load, variations in thermal tensing are greatly reduced, which minimizes variations in the beam divergence in the far field, and the tensing can be compensated for with optical means in a manner well known in the art.

Additionally, using the Kerr cell to rotate the pump laser beam polarization between its two extremes at some desired frequency allows for spectral modulation of the output laser beam. That is, the converted signal laser beam ($\lambda_2$) and idler signal laser beam ($\lambda_3$) turn on and off at the same frequency as the polarization is switched between its two extremes. This creates pulsed amplitude modulation of all laser beams output from the wavelength converter.

Further, by using the Kerr cell to vary the polarization of the pump laser beam to other than between its two extremes (orthogonal planes), a variable amplitude output from the OPO/OPA wavelength converter can be obtained. This allows for the generation of amplitude modulated waveforms of all laser beams output from the wavelength converter.

DESCRIPTION OF THE DRAWING

The invention will be better understood upon reading the following Detailed Description in conjunction with the drawing in which.

DETAILED DESCRIPTION

Figure 1:
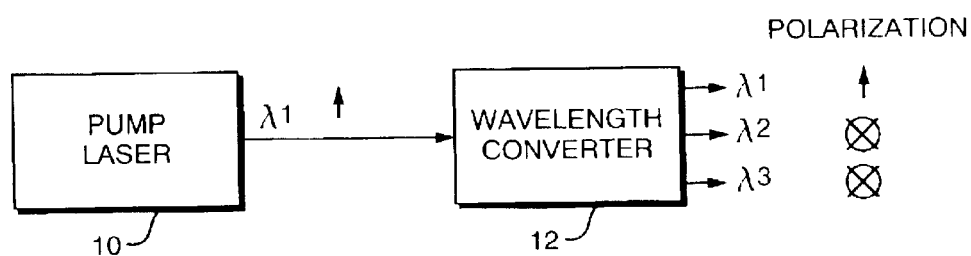
FIG. 1 is a block diagram of a prior art wavelength converter.

FIG. 1 is a block diagram of a prior art wavelength converter system. Typically, in the prior art, laser frequency conversion is accomplished using a high intensity pump laser 10 and a wavelength converter 12 as shown in FIG. 1. In this approach, a high intensity pump laser 10, emitting linearly polarized light at wavelength, $\lambda_1$, with a first polarization (vertical polarization for this example), impinges on a crystal having a non-linear optic characteristic in wavelength converter 12. The non-linear characteristic of the crystal in wavelength converter 12 results in output beams at three different wavelengths. The output beams include a fraction of the energy of the input pump laser beam of wavelength $\lambda_1$ not converted by the crystal of converter 12, the energy converted to the desired output laser beam of wavelength, $\lambda_2$, and a third laser beam at an idler wavelength, $\lambda_3$.

In order to achieve pulsed amplitude modulation and control, the pump laser 10 is either turned off, or it can be interrupted using a separate switch or mechanical chopper (not shown in FIG. 1) to produce the square wave shown in FIG. 1. Using this approach, all three wavelengths are available at the output of the wavelength converter 12 when the pump laser 10 is turned on. When the pump laser 10 is turned off, none of the wavelengths are available. This approach has the effect of creating a variable thermal load on the crystal in wavelength converter 12 that creates a variable thermal tensing effect that cannot be adequately compensated for. There is no way to create a variable amplitude modulation (e.g. sinusoidal) of the pump laser signal into wavelength converter 12 and, accordingly, create the same amplitude modulation of signals output from wavelength converter 12.

Figure 2:
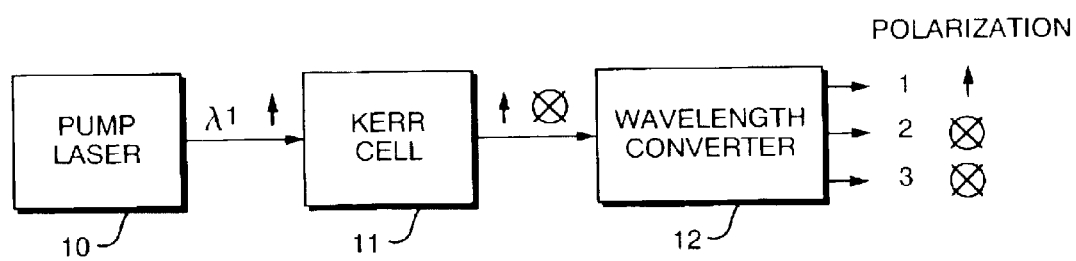
FIG. 2 is a block diagram showing the present invention.

The present invention, shown in FIG. 2, is a novel apparatus that adds multifunction capability to a wavelength converter 12. It reduces the prior art problem of thermal lens variation in a modulated system that leads to variations in the beam divergence in the far field, thus reducing the formation of varying "hot spots" in the laser system optics. In addition, it provides amplitude modulation of the converted laser beam of wavelength ($\lambda_2$) and an idler laser beam of wavelength ($\lambda_3$) in both a digital (ON/OFF) and an analog (% of full power) mode output.

In the preferred embodiment of the invention shown in FIG. 2, a Kerr cell modulator 11 is placed between the pump laser 10 and the wavelength converter 12. In the preferred embodiment of the invention the wavelength converter 12 comprises an optical parametric oscillator/amplifier (OPO/OPA) wavelength converter. A Kerr cell modulator 11 is an electro-optic crystal, which causes the polarization vector of an impinging laser beam to be rotated from its normal position when a voltage is applied to the crystal in a manner well known in the art. As the voltage applied to the crystal is gradually increased, the polarization vector is correspondingly rotated a greater amount. By modulating the electric field applied to the crystal it is possible to rotate the polarization vector between zero and ninety degrees. By using Kerr cell 11 to selectively rotate the polarization of a pump laser beam input to wavelength converter 12, creates a condition wherein the pump laser beam is not always phase-matched in the crystal in wavelength converter 12.

The addition of Kerr cell modulator 11 has multiple benefits on the system design. It helps to maintain a constant thermal load on the crystal in wavelength converter 10 in order to minimize the variation of the spatial beam divergence on the target, with the end result that more energy is deposited on target. In addition, it reduces the potential for "hot spots" in the optical system by minimizing the dynamic lensing effect of the crystal in wavelength converter 12. Also, it allows the system to provide a constant interrogation or tracking signal independent of the wavelength converted output laser beam ($\lambda_2$). Finally, it allows the system designer to achieve a multi-function capability with fewer components.

In the prior art, when no wavelength conversion is desired the pump laser beam is switched off, either electrically or with an optical modulator. This has the effect of stopping all energy absorption by the wavelength converter crystal from the input laser beam, allowing the temperature in the crystal to drop to a level closer to the temperature of the crystal at rest. When the beam is again turned on, the temperature will again quickly rise as the crystal absorbs energy from the beam. This dynamic cyclic change in temperature causes the crystal's index of refraction to change, creating a lensing effect, which results in an unwanted change in the spatial divergence of the laser beam exiting the crystal.

In the preferred embodiment of the invention, shown in FIG. 2, by using Kerr cell modulator 11 to modulate the polarization of the laser beam output from pump laser 10, the laser beam can be made to propagate through a crystal (not shown) in wavelength converter 12 with its polarization vector in a first direction where no wavelength conversion takes place in the crystal of the wavelength converter. The laser energy is all at pump laser beam wavelength $\lambda_1$. In this polarization orientation, with no wavelength conversion taking place, the crystal absorbs energy from the laser beam at a first rate.

The crystal in wavelength converter 12 will absorb energy at a different rate when the polarization of the laser beam is rotated ninety degrees by applying a voltage to Kerr cell modulator 11. However, this rate differential is less than in the prior art so the differences in thermal lensing are reduced. When the laser beam polarization is rotated the maximum of ninety degrees, maximum wavelength conversion takes place and there are output laser beams at wavelengths $\lambda_1$, $\lambda_2$, and $\lambda_3$. The absorption coefficient of the crystal in wavelength converter 12 may be different for a laser beam of wavelength $\lambda_1$ than for laser beams having wavelengths $\lambda_2$ and $\lambda_3$. Thus, the rate at which energy is absorbed in the crystal is different than when only a laser beam of wavelength $\lambda_1$ is present. In most cases this difference is small and results in a stable lensing condition in the crystal of wavelength converter 12, which can be compensated with a low power optical component. Because the total thermal energy is always constant between the laser beams at the three wavelengths but is divided between the three laser beams at wavelengths $\lambda_1$, $\lambda_2$, and $\lambda_3$, the same thermal load exists on the crystal in wavelength converter 12 whether or not Kerr cell 10 is being used to rotate the pump laser beam. Therefore, there is no varying thermal lensing, and the thermal lensing can be easily compensated for. The final result is a lower divergence laser beam and higher intensity output for the same input laser beam than is achievable in the prior art.

Tightly focused "hot spots" in a laser system are the major cause of damage to its components. All laser designs strive to avoid "hot spots" by careful analysis and design, but "hot spots" cannot be eliminated. They can only be minimized. When there is thermal absorption in a crystal, such as in the crystal in wavelength converter 12, there is created a dynamic lensing condition where the optical power of the lens varies with time. This significantly increases the difficulty of designing a laser system because it is very difficult to anticipate all of the possible lensing conditions that might occur as power levels in various parts of an adjustable system change.

By using the teaching of the present invention, with roughly constant energy being absorbed by the crystal, the thermal lensing variation is minimized, made fairly constant, and is easily corrected optically in a manner well known in the art. Therefore, laser system design time is simplified and there is increased reliability of the laser system By varying the modulation voltage applied to Kerr cell 11 between minimum and maximum, the polarization of the pump laser beam passing therethrough may be varied between a minimum of zero degrees and a maximum of ninety degrees. As the modulation voltage is decreased toward zero volts, the polarization shift decreases to zero degrees and a greater percentage of the power of the pump laser beam input to the crystal of wavelength converter 12 is unconverted and remains at pump laser beam wavelength $\lambda_1$. This allows control of the output power of the continuous wave energy laser beam at wavelength $\lambda_1$, which is the fraction of input energy that is not converted and that can be used for interrogation, tracking, or radar functions. The output power of the converted laser beams at wavelengths $\lambda_2$, and $\lambda_3$ can be controlled in the same way. As the voltage applied to Kerr cell 11 is increased, the polarization vector of the laser beam increases from zero degrees toward ninety degrees. The fraction of the pump laser beam energy of wavelength $\lambda_1$ that is converted to wavelengths $\lambda_2$ and $\lambda_3$ increases, and the fraction of the laser beam energy remaining at wavelength $\lambda_1$ decreases.

As the voltage applied to Kerr cell 11 is modulated, the polarization vector of the laser beam is modulated accordingly. This causes the unconverted pump laser beam at wavelength $\lambda_1$, the converted laser beam at wavelength $\lambda_2$, and the idler laser beam at wavelength $\lambda_3$ to be modulated at the same rate as the modulation voltage applied to Kerr cell 11. This allows for amplitude modulation of the converted laser beam at wavelength ($\lambda_2$) and idler laser beam at wavelength ($\lambda_3$) in both a digital (on/off) and an analog (percent of full power) mode. When the instantaneous power of the unconverted output laser beam at wavelength $\lambda_1$ is at a maximum (e.g. peak of a sinusoidal signal), the instantaneous power of the converted laser beam at wavelength $\lambda_2$ and the idler laser beam at wavelength $\lambda_3$ are at a minimum because the total power between these three laser beams is constant. Similarly, when the instantaneous power of the unconverted output laser beam at wavelength $\lambda_1$ is at a minimum (e.g. valley of a sinusoidal signal), the instantaneous power of the converted laser beam at wavelength $\lambda_2$ and the idler laser beam at wavelength $\lambda_3$ are at a maximum because the total power between these three laser beams is constant. Thus, there is a ninety degree phase shift between the unconverted output laser beam at wavelength $\lambda_1$ and the converted laser beam at wavelength $\lambda_2$ and the idler laser beam at wavelength $\lambda_3$.

By using Kerr cell 11 to vary the pump laser beam polarization in other than between its two extremes (orthogonal planes), variable amplitude laser beams are output from wavelength converter 12. This allows for amplitude modulation of the laser beam's output from wavelength converter 12 to any waveform.

Finally, this multi-function capability is achieved with fewer components. By placing Kerr cell modulator 111 between pump laser 10 and wavelength converter 12, Kerr cell modulator 11 acts as a switch to rotate the polarization of the pump laser beam to the aspect required for wavelength conversion to take place in the crystal of converter 12. This can be done actively, allowing modulation of the output laser beams at wavelengths $\lambda_1$, $\lambda_2$, and $\lambda_3$ as required without the need for additional external modulators.

In summary, the current invention has the advantage of improving/minimizing overall beam divergence in a wavelength conversion system while providing amplitude modulated output laser beams. It also provides a multi-function capability and reduces overall complexity, weight, and cost and increases reliability. It can be used to add a tracking function to any laser-based remote sensing application. By reducing the thermal effects in the non-linear optical crystal of the wavelength converter 12, the current invention can reduce "hot spots" caused by the variation in lens power of the wavelength converter. This can ease the design problems in complex lasers and lead to higher reliability and longer component life.

While what has been described herein is the preferred embodiment of the invention, it will be understood by those skilled in the art that numerous changes may be made without departing from the spirit and scope of the invention.

What is claimed is:

1. Apparatus for amplitude modulating a laser beam output from an optical wavelength converter responsive to a modulation signal where a source laser beam having a first wavelength is input to the converter and converted to a second wavelength, said apparatus comprising:

means for changing the polarization of the first wavelength laser beam before it is input to the optical wavelength converter;

wherein the polarization changing means is controlled by the modulation signal to change the polarization of the first wavelength laser beam before it is input to the wavelength converter and thereby causing a corresponding change in the amplitude of the second wavelength laser beam output from the optical wavelength converter.

2. The apparatus in accordance with claim 1 wherein the polarization changing means is a Kerr cell and the modulation signal is applied to the Kerr cell to change the polarization of the source laser beam.

3. The apparatus in accordance with claim 2 wherein the wavelength converter comprises an optical parametric oscillator/amplifier.

4. The apparatus in accordance with claim 1 wherein the first wavelength laser beam is output from the wavelength converter at the same time as the second wavelength laser beam, and as the amplitude of the second wavelength laser beam increases responsive to the modulation signal the amplitude of the first wavelength laser beam decreases correspondingly, thereby also modulating the first wavelength laser beam.

5. The apparatus in accordance with claim 4 wherein the total power of the laser beams passing through the wavelength converter remains constant despite the amplitude modulation, thereby providing a constant thermal load that causes constant thermal lensing in the optical wavelength converter that can be compensated for.

6. The invention in accordance with claim 2 wherein by adjusting the voltage of the modulation signal applied to the Kerr cell the polarization of the first wavelength laser beam is varied between zero and ninety degrees, and when the polarization is at zero degrees only the first wavelength laser beam is output from the wavelength converter, and when the polarization is at ninety degrees only the second wavelength laser beam is also output from the wavelength converter.

7. The apparatus in accordance with claim 5 wherein the wavelength converter comprises an optical parametric oscillator/amplifier.

8. The apparatus in accordance with claim 7 wherein the polarization changing means is a Kerr cell and the modulation signal is applied to the Kerr cell to change the polarization of the source laser beam.

9. A method for amplitude modulating a laser beam output from an optical wavelength converter responsive to a modulation signal where a source laser beam having a first wavelength is input to the converter and converted to a second wavelength, said method comprising the step of:

changing the polarization of the first wavelength laser beam responsive to the modulation signal before it is input to the optical wavelength converter;

wherein said changing polarization of the first wavelength laser beam causes a corresponding change in the amplitude of the second wavelength laser beam output from the optical wavelength converter.

10. The method in accordance with claim 9 wherein the first wavelength laser beam is output from the wavelength converter at the same time as the second wavelength laser beam, and as the amplitude of the second wavelength laser beam increases responsive to the modulation signal the amplitude of the first wavelength laser beam decreases correspondingly, thereby also modulating the first wavelength laser beam.

11. The method in accordance with claim 10 wherein the total power of the laser beams passing through the wavelength converter remains constant despite the amplitude modulation, thereby providing a constant thermal load that causes constant thermal lensing in the optical wavelength converter that can be compensated for.

12. Apparatus for reducing thermal lensing in the crystal of an optical wavelength converter when amplitude modulating a laser beam output from the wavelength converter responsive to a modulation signal, where a source laser beam having a first wavelength is input to the converter and is converted to a second wavelength, said apparatus comprising:

means for changing the polarization of the first wavelength laser beam before it is input to the optical wavelength converter;

wherein the total power of the laser beams passing through the wavelength converter remains constant despite the amplitude modulation, thereby providing a constant thermal load that causes constant thermal lensing that can be compensated for.

13. The apparatus in accordance with claim 12 wherein the wavelength converter comprises a crystal that is subject to thermal stress by the laser beams passing therethrough to cause thermal lensing.

14. The apparatus in accordance with claim 13 wherein a change in the polarization of the first wavelength laser beam is effected by a Kerr cell and the modulation signal is applied to the Kerr cell to change the polarization of the source laser beam.

15. The apparatus in accordance with claim 14 wherein the first wavelength laser beam is output from the wavelength converter at the same time as the second wavelength laser beam, and as the amplitude of the second wavelength laser beam increases responsive to the modulation signal the amplitude of the first wavelength laser beam decreases correspondingly, thereby also modulating the first wavelength laser beam.

16. A method for reducing thermal lensing in the crystal of an optical wavelength converter when amplitude modulating a laser beam output from the wavelength converter responsive to a modulation signal, where a source laser beam having a first wavelength is input to the converter and is converted to a second wavelength, said method comprising:

changing the polarization of the first wavelength laser beam before it is input to the optical wavelength converter;

wherein the total power of the laser beams passing through the wavelength converter remains constant despite the amplitude modulation, thereby providing a constant thermal load that causes constant thermal lensing that can be compensated for.

17. The method in accordance with claim 16 wherein the wavelength converter is a crystal that is subject to thermal stress to cause thermal lensing.

18. The method in accordance with claim 17 wherein the step of changing the polarization of the first wavelength laser beam is accomplished using a Kerr cell to which the modulation signal is applied and thereby changes the polarization of the source laser beam passing therethrough.

\* \* \* \* \*